(12) United States Patent
Scheiber

(10) Patent No.: US 9,150,347 B2
(45) Date of Patent: Oct. 6, 2015

(54) CARTRIDGE CONTAINING BREWABLE SUBSTANCE

(76) Inventor: Eugene Scheiber, Brooklyn, NY (US)

(*) Notice: Subject to any disclaimer, the term of this patent is extended or adjusted under 35 U.S.C. 154(b) by 300 days.

(21) Appl. No.: 13/594,079

(22) Filed: Aug. 27, 2012

(65) Prior Publication Data

US 2013/0270176 A1    Oct. 17, 2013

Related U.S. Application Data

(60) Provisional application No. 61/623,139, filed on Apr. 12, 2012.

(51) Int. Cl.
*B65D 85/804* (2006.01)
*A47J 31/06* (2006.01)

(52) U.S. Cl.
CPC ......... *B65D 85/8043* (2013.01); *A47J 31/0668* (2013.01)

(58) Field of Classification Search
None
See application file for complete search history.

(56) References Cited

U.S. PATENT DOCUMENTS

| 2,828,789 | A | | 4/1958 | Geisler et al. ............. 220/783 |
| 4,859,337 | A | * | 8/1989 | Woltermann .............. 210/474 |
| D333,755 | S | | 3/1993 | Oleksiuk ................... D7/400 |
| D341,059 | S | | 11/1993 | Watson ...................... D7/400 |
| 5,325,765 | A | | 7/1994 | Sylvan et al. ............... 99/295 |
| 5,840,189 | A | | 11/1998 | Sylvan et al. ............. 210/474 |
| D426,160 | S | | 6/2000 | Lindsay et al. ............ D9/500 |
| D452,633 | S | | 1/2002 | Valkovich .................. D7/400 |
| D474,110 | S | | 5/2003 | Sweeney .................... D9/428 |
| D474,111 | S | | 5/2003 | Lazaris ...................... D9/428 |
| 6,645,537 | B2 | | 11/2003 | Sweeney et al. ............ 426/79 |
| D524,691 | S | | 7/2006 | Caruso ..................... D11/152 |
| D546,140 | S | | 7/2007 | Anzalone .................. D7/672 |
| D606,363 | S | | 12/2009 | Aardenburg ............... D7/400 |
| D607,329 | S | | 1/2010 | Diss .......................... D9/500 |
| D652,266 | S | | 1/2012 | Smyers ..................... D7/630 |
| D695,110 | S | | 12/2013 | Houlton et al. ............ D9/500 |
| D710,686 | S | | 8/2014 | Gowens ..................... D9/429 |
| D715,649 | S | | 10/2014 | O'Brien ..................... D9/500 |
| 2009/0205504 | A1 | * | 8/2009 | Navarro Alcantara ...... 99/295 |
| 2010/0003371 | A1 | * | 1/2010 | Ozanne et al. ............. 426/77 |
| 2010/0108541 | A1 | † | 5/2010 | Roberto | |
| 2010/0203198 | A1 | † | 8/2010 | Yoakim et al. | |
| 2011/0303095 | A1 | | 12/2011 | Fu et al. .................... 99/317 |

FOREIGN PATENT DOCUMENTS

WO    2013043048    †    3/2013

OTHER PUBLICATIONS

U.S. Office Action mailed May 6, 2015 issued in related U.S. Appl. No. 29/430,408.

\* cited by examiner
† cited by third party

*Primary Examiner* — Benjamin Kurtz
(74) *Attorney, Agent, or Firm* — Ostrolenk Faber LLP

(57) ABSTRACT

Disclosed is a cartridge for retaining a mass of, for example, ground coffee, that includes a cup, a filter, and a filter support that supports the filter inside the cup.

10 Claims, 6 Drawing Sheets

CARTRIDGE CONTAINING BREWABLE SUBSTANCE

CROSS REFERENCE TO RELATED APPLICATIONS

The present application claims priority of U.S. Provisional Patent Application No. 61/623,139, filed Apr. 12, 2012, the entire contents of which are hereby incorporated in full by reference.

FIELD OF THE INVENTION

The present invention relates to a cartridge arrangement for storing and brewing a brewable substance such as, for example, a mass of ground coffee.

BACKGROUND OF THE INVENTION

Brewing machines for brewing coffee are well known. One well known brewing machine, which is disclosed in U.S. Pat. No. 5,325,765, is configured to receive a cartridge that contains a mass of brewable substance such as coffee. The cartridge includes a fluid impermeable cup made from a flexible plastic inside of which a filter is disposed. The filter, which is shaped like a cup or a cone, is directly joined to the interior wall of the cup at the top edge of the cup, which defines the mouth of the cup. The brewable substance is deposited inside the filter and the mouth of the cup is closed with a metal foil, which is joined to a radially extending flange residing at the mouth of the cup.

To brew the brewable substance, the machine disclosed in U.S. Pat. No. 5,325,765 is configured to inject hot water into the cartridge with a means that pierces the foil. Exposure to the hot water so injected for a short period of time brews the substance inside the cartridge to produce a brewed beverage (e.g. coffee). The brewed beverage passes through the filter and is deposited at the bottom of the cup. Thereafter, the machine disclosed in U.S. Pat. No. 5,325,765 pierces the bottom of the cup allowing the brewed beverage to exit.

Keurig, Inc., the assignee of U.S. Pat. No. 5,325,765, markets a machine according to U.S. Pat. No. 5,325,765 as well as cartridges for use with that machine. U.S. Pat. No. 5,840,189, also assigned to Keurig, Inc., discloses a cartridge for use with the machine disclosed in U.S. Pat. No. 5,325,765.

The cartridges marketed by Keurig, Inc. for use with the Keurig machines are slightly different in configuration than the cartridges disclosed in U.S. Pat. No. 5,840,189. FIG. 1 illustrates a cross-sectional view of a cartridge 10 marketed by Keurig, Inc. Referring to FIG. 1, cup 12 of cartridge 10 includes a frustoconical bottom portion 14 having a closed bottom 16 and an open top 18 defined by a top edge 19. An endless, annular wall 20, which may be cylindrical, is joined at its bottom edge 22 to edge 19 of frustoconical bottom portion 14 via an intermediate, endless, annular, flange portion 24. Intermediate flange portion 24 extends radially away from the interior of frustoconical bottom portion 14 and surrounds top edge 19 of frustoconical bottom portion 14 and its top edge 19. Wall 20 terminates at a top edge 21, which defines the open mouth of cup 12. Top edge 21 is joined with a top flange 26 that extends away from the interior of wall 20 in a radial direction. Foil 28 is joined with top flange 26. A cup shaped filter 30 extends from top edge 21 of wall 20 to a depth less than the depth of cup 12, whereby bottom 31 of filter 30 is spaced from closed bottom 16 of cup 12. A portion of filter 30 extending from its top edge 33 is directly joined to an interior surface of wall 20 as illustrated in FIG. 1.

SUMMARY OF THE INVENTION

It is an object of the present invention to provide a new cartridge that can include a brewable substance such as coffee or the like.

It is yet another object of the present invention to provide a cartridge suitable for use with a machine as described above.

A cartridge according to the present invention includes a filter body, which resides in a fluid impermeable cup, but is not joined directly with its interior surface. Rather, a novel filter support is provided to support the filter body inside of the cup.

A cartridge for retaining a mass according to the present invention includes a fluid impermeable cup having an interior space, and a retainer that includes a fluid permeable filter that retains a mass joined to a filter support. The filter and the filter support are received in the interior space of the cup and the filter support rests against an interior surface of the cup to support the filter inside the interior space of the cup. Preferably, neither the filter nor the filter support extends outside of the interior space of the cup.

In the preferred embodiment, the filter support includes at least one portion having an exterior surface that makes intimate contact (i.e. surface to surface contact) with an interior surface of the cup, and a second ring portion that may also make intimate contact with another interior surface of the cup. The first ring portion may have one outer diameter and the second ring portion may have another outer diameter smaller than the outer diameter of the first ring portion. The inner diameter of the first ring portion and the inner diameter of the second ring portion may be equal to one another.

In the preferred embodiment, the filter is received interiorly of the first ring portion and the second ring portion and includes a top portion that is joined with the first ring portion. Preferably, the filter is configured to be a pouch or a cone having a top portion that includes the edge defining the mouth of the pouch or the cone for receiving the mass inside the filter. In the preferred embodiment, the top portion of the filter is joined to a radially oriented annular surface of the first ring portion of the filter support.

In the preferred embodiment, the cup includes a flange portion radially extending away from the interior space. The filter support is preferably configured so that its radially oriented surface is spaced from the flange portion. A foil or the like may be joined with the flange thereby closing the interior space of the cup, and defining a space above the radially oriented surface of the first ring portion.

Either or both first ring portion and the second ring portion of the filter support may be dimensioned to realize intimate contact (i.e. surface to surface contact) with the interior surface of the cup so that fluid does not pass between the filter support and the interior surface of the cup. The filter support is preferably a unitary body.

Other features and advantages of the present invention will become apparent from the following description of the invention which refers to the accompanying drawings.

BRIEF DESCRIPTION OF THE DRAWING(S)

DETAILED DESCRIPTION

Figure 1:
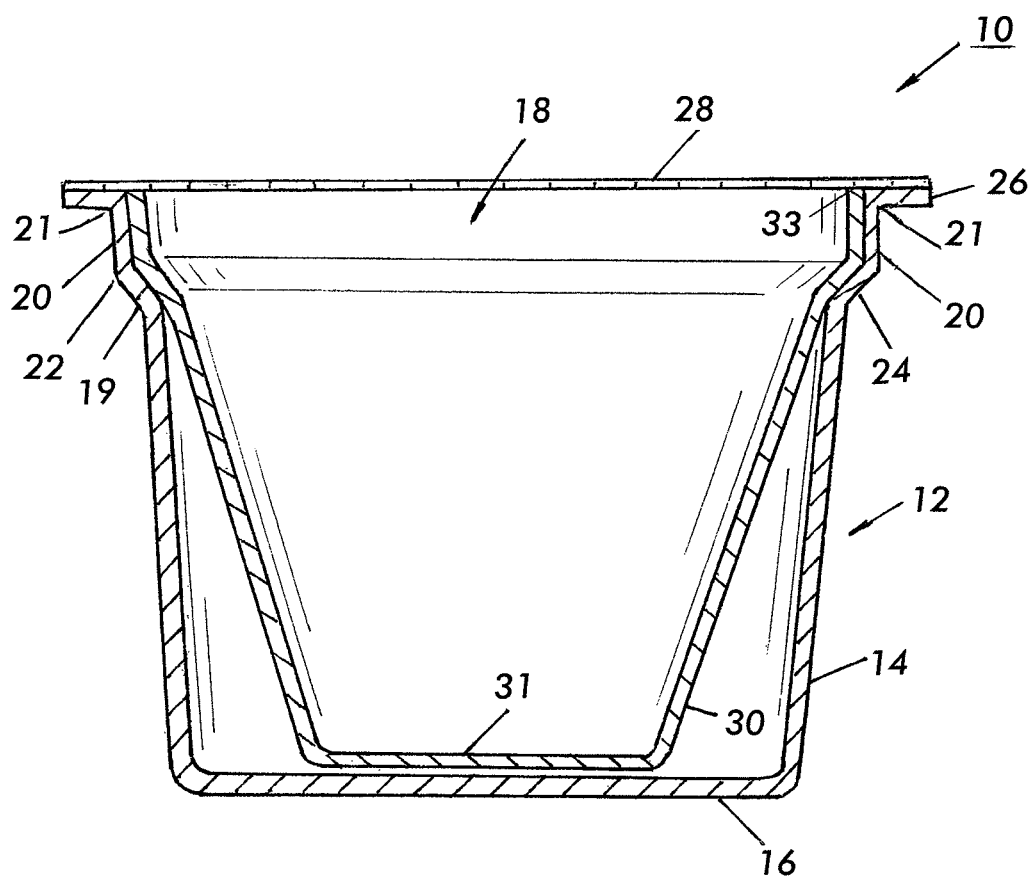
FIG. 1 illustrates a cross-sectional view of a cartridge marketed by Keurig, Inc.
Figure 2:
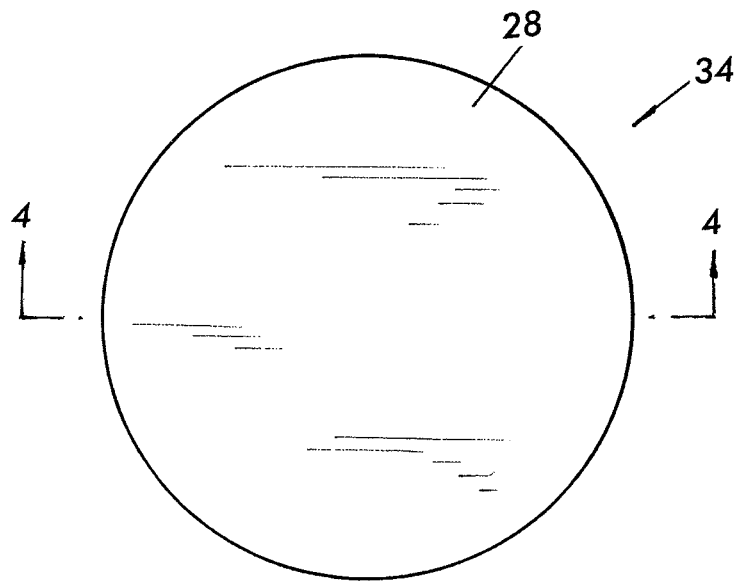
FIG. 2 illustrates a top plan view of a cartridge according to the present invention.
Figure 3:
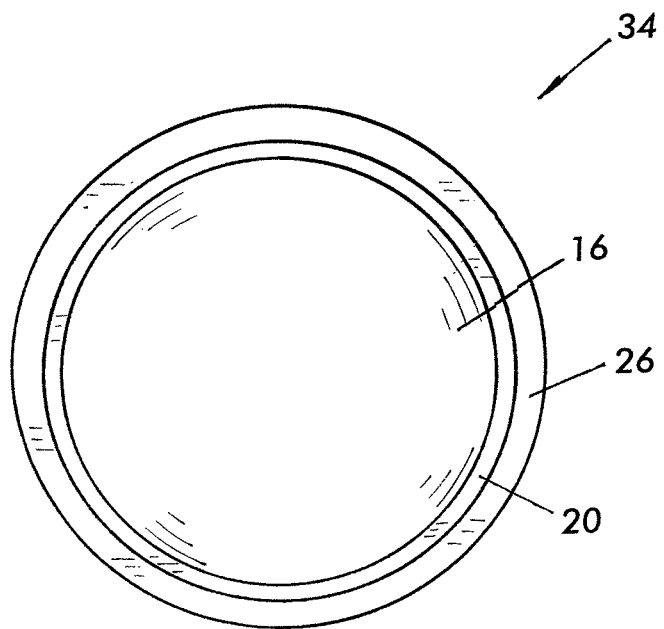
FIG. 3 illustrates a bottom plan view of a cartridge according to the present invention.

Referring to FIGS. 2-6A, a cartridge 34 according to the present invention includes a cup 12 having substantially the same features as the cup illustrated in FIG. 1 and described earlier. Thus, a cartridge 34 according to the present invention includes a cup 12 having a frustoconical bottom portion 14 with a closed bottom 16 and an open top 18 defined by a top edge 19. An endless, annular wall 20 is joined at its bottom edge 22 to edge 19 of frustoconical bottom portion 14 via an intermediate, endless, annular flange portion 24. Annular wall 20 may be cylindrical as illustrated in FIG. 4B, or it may be a frustum with its base joined with flange portion 26 as illustrated in FIG. 4A. In an alternative embodiment, annular wall 20 may be an upside down frustum with a base joined with intermediate flange portion 24 as illustrated in FIG. 4C.

Figure 4A:
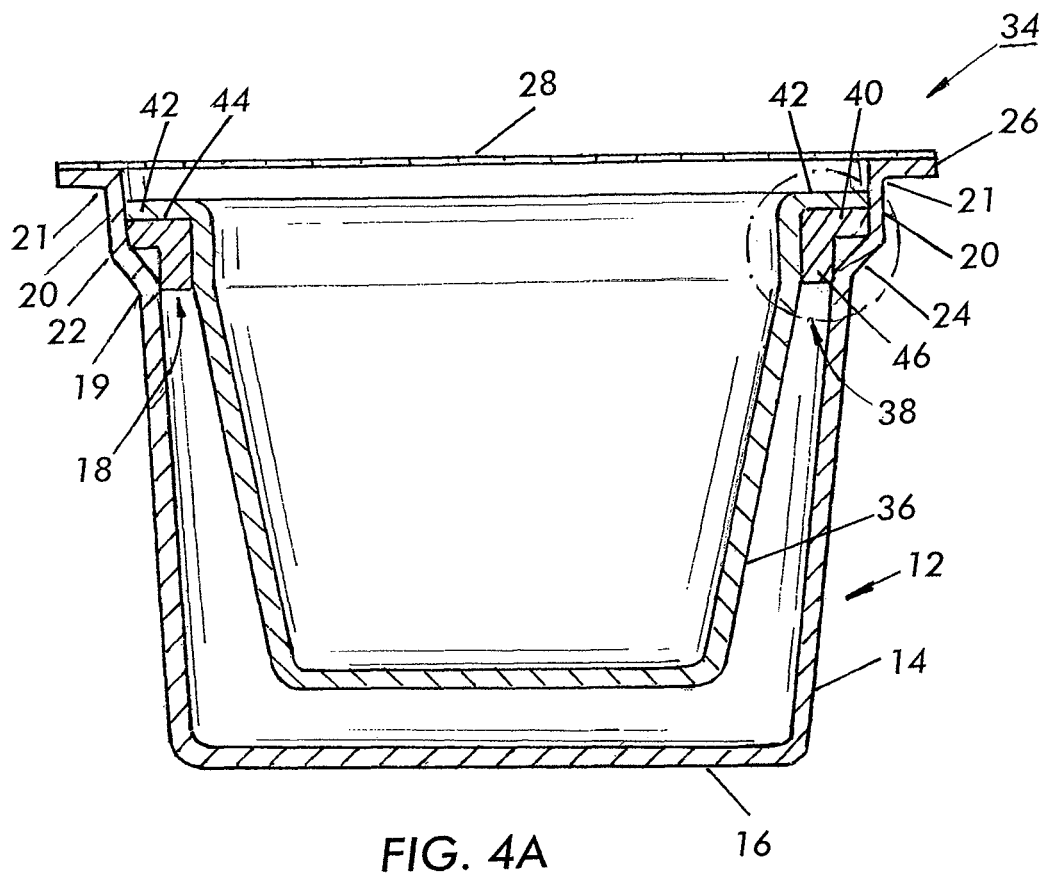
FIG. 4A illustrates a cross-sectional view of a cartridge according to the present invention along line 4-4 in FIG. 2 viewed in the direction of the arrows.
Figure 4B:
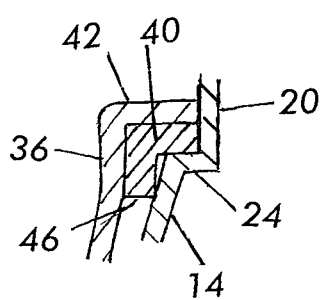
FIG. 4B illustrates a variation of the features identified by the circle in FIG. 4A.
Figure 4C:
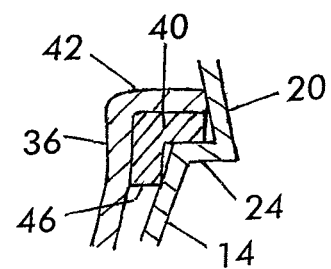
FIG. 4C illustrates another variation of the features identified by the circle in FIG. 4A.
Figure 5:
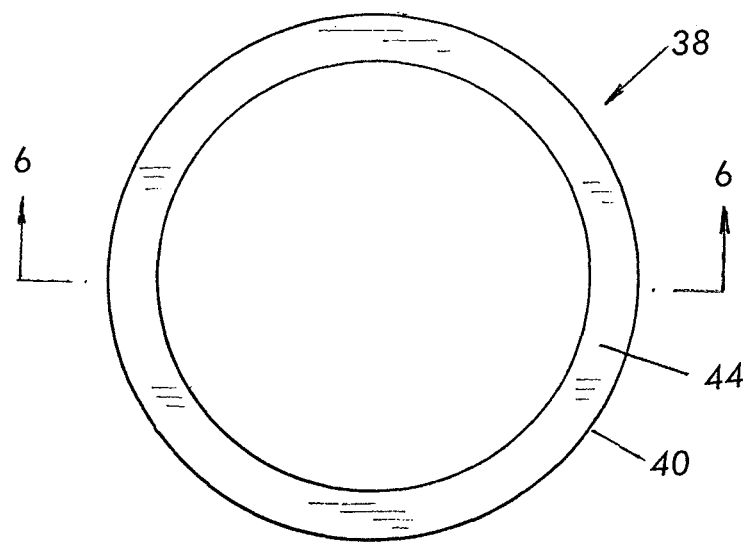
FIG. 5 illustrates a top plan view of a filter support used in a cartridge according to the present invention.

Intermediate flange portion 24 extends away (preferably radially away as shown in FIG. 4B and FIG. 4C) from the interior of frustoconical bottom portion 14 and surrounds top edge 19 of frustoconical bottom portion 14. Wall 20 terminates at a top annular edge 21, which defines the open mouth of cup 12. Top edge 21 is joined with a top annular flange 26 that extends away from the interior of wall 20 in a radial direction. Cup 12 is a unitary body preferably made of a suitable plastic that is fluid impermeable and can be pierced at bottom 16 to allow the brewed beverage to exit in the manner described earlier.

A cartridge according to the present invention also includes a filter body 36 which is fluid permeable. A suitable material for fabrication of filter body 36 is filter paper although other materials may be used. Filter body 36 is preferably a pouch or the like configuration although a cup-shaped (e.g. cone shaped) filter body 36 may also be used without deviation from the scope and spirit of the present invention. Filter body 36 is preferably formed as described below.

While a cartridge according to the present invention includes a filter body 36 that receives a mass of brewable substance such as ground coffee, unlike the Keurig cartridge shown in FIG. 1 and described above, filter body 36 is not directly joined to the interior surface of cup 12. Rather, according to an aspect of the present invention, filter body 36 is joined to a filter support 38, which is fully received inside of cup 12. Specifically, filter support 38 is a unitary body preferably made from plastic that includes an upper ring portion 40 having an outer diameter that is about the same as an interior diameter of wall 20 of cup 12. A top portion 42 of filter body 36 that includes its top edge is received in the interior of upper ring portion 40, is folded over and directly joined to the radially oriented top surface 44 of upper ring portion 40. The thickness of upper ring portion 40 is selected to be preferably less than the depth of wall 20 of cup 12, whereby upper ring portion 40 is fully received inside cup 12 and rests on intermediate flange portion 24. Filter body 36 is joined to top surface 44 by heat sealing or the like method as described below.

Filter support 38 preferably includes a lower ring portion 46 having an outer diameter that is less than an inner diameter of intermediate flange 24 and about the same as the inner diameter of the open mouth of frustoconical bottom portion 14 that includes the edge of frustoconical bottom portion 14 so that lower ring portion 46 may be received inside frustoconical bottom portion 14 of cup 12. The outer diameter of lower ring portion 46 may be selected so that lower ring portion 46 makes intimate contact (i.e. surface to surface contact) with the interior surface of frustoconical bottom portion 14 somewhere above the bottom of filter body 36.

Because upper ring portion 40 has the same outer diameter as an inner diameter of wall 20, upper ring portion 40 makes intimate contact (i.e. surface to surface contact) with the interior surface of wall 20 thus preventing hot water from seeping into frustoconical bottom portion 14 without passing through filter body 36. That is, upper ring portion 40 makes a good enough intimate contact with the interior surface of wall 20 to seal the space between foil 28 and upper ring portion 40 from frustoconical bottom portion 14, whereby hot water is directed through filter body 36. Lower ring portion 46 provides further sealing and also helps stabilize the upper ring portion 40 inside of cup 12. Note that preferably, top surface 44 of upper ring portion 40 does not reach the top edge of wall 20, i.e. does not reach the mouth of cup 12.

Figure 6A:
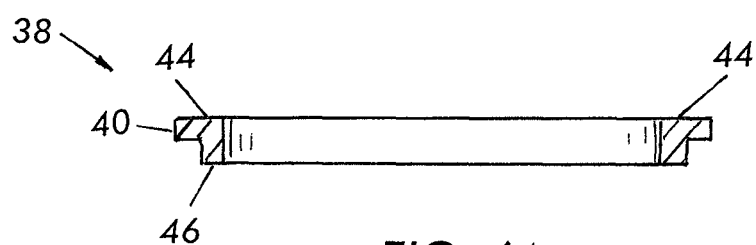
FIG. 6A illustrates a cross-sectional view of the filter support along line 6-6 in FIG. 5 viewed in the direction of the arrows.

Referring to FIG. 6A, upper ring portion 40 has an outer diameter that is larger than the outer diameter of lower ring portion 46, and preferably the inner diameters of upper ring portion 40 and lower ring portion 46 are equal.

Figure 6B:
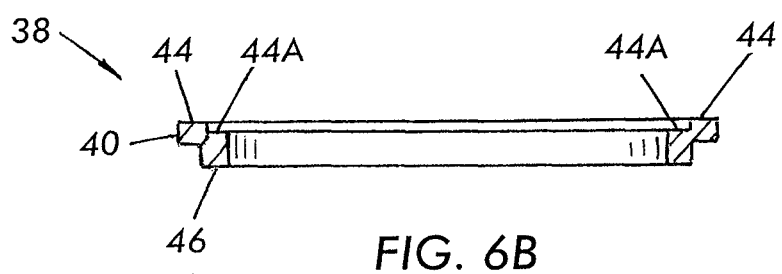
FIG. 6B illustrates a cross-sectional view of a variation of the filter support along line 6-6 in FIG. 5 that would be viewed in the direction of the arrows.
Figure 6C:
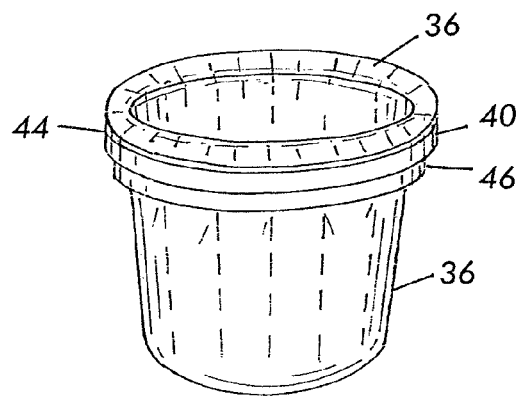
FIG. 6C shows an elevation view of a retainer that includes a filter support according to the variation shown in FIG. 6B.
Figure 6D:
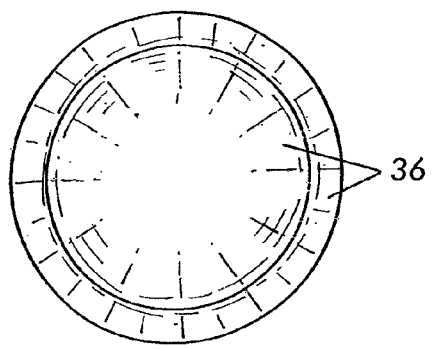
FIG. 6D shows a top plan view of the retainer shown in FIG. 6C.
Figure 6E:
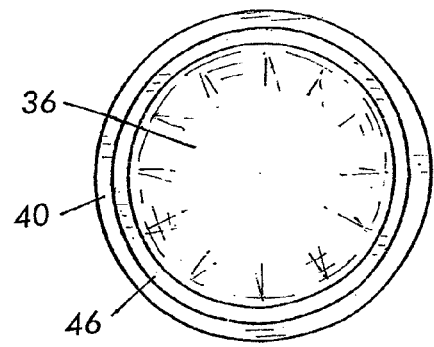
FIG. 6E shows a bottom plan view of the retainer shown in FIG. 6C.
Figure 6F:
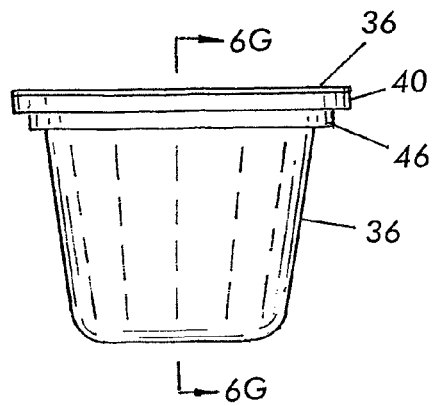
FIG. 6F shows a side plan view of the retainer shown in FIG. 6C.
Figure 6G:
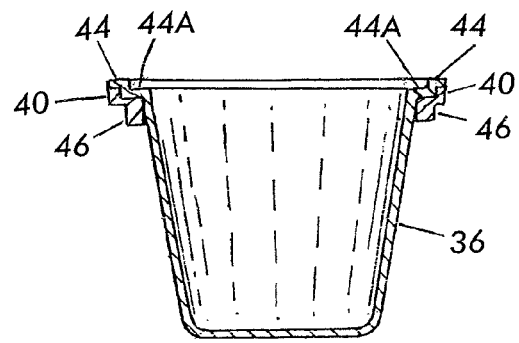
FIG. 6G shows a cross-sectional view of the retainer along line 5-5 in FIG. 6F, viewed in the direction of the arrows.

Referring to FIG. 6B, an annular recess 44A may be defined in upper ring portion 40 adjacent surface 44. Recess 44A helps filter paper fuse better with the upper ring portion 40 as more surface area is provided for joining the top portion of filter 36 to upper ring portion 40. Consequently, filter 36 can be loaded with more weight without causing its joint with upper ring portion 40 to fail.

FIGS. 6C-6G illustrate a retainer that includes a filter support 38 and a filter 36 joined to filter support 38. As shown best in FIG. 6G, the top portion of filter 36 is joined to surface 44 as well as surfaces defined by recess 44A. The top portion of filter 36 extends to the outermost annular edge of upper ring portion 40. Otherwise, the arrangement is the same as the retainer arrangement described above.

A cartridge according to the present invention further includes a foil 28 which is joined to top flange 26 to enclose the brewable substance that resides inside filter body 36 in the same manner as a Keurig cartridge depicted in FIG. 1 and described above.

A cartridge according to the present invention while different in configuration may be used in a machine as disclosed in U.S. Pat. No. 5,325,765.

Figure 7:
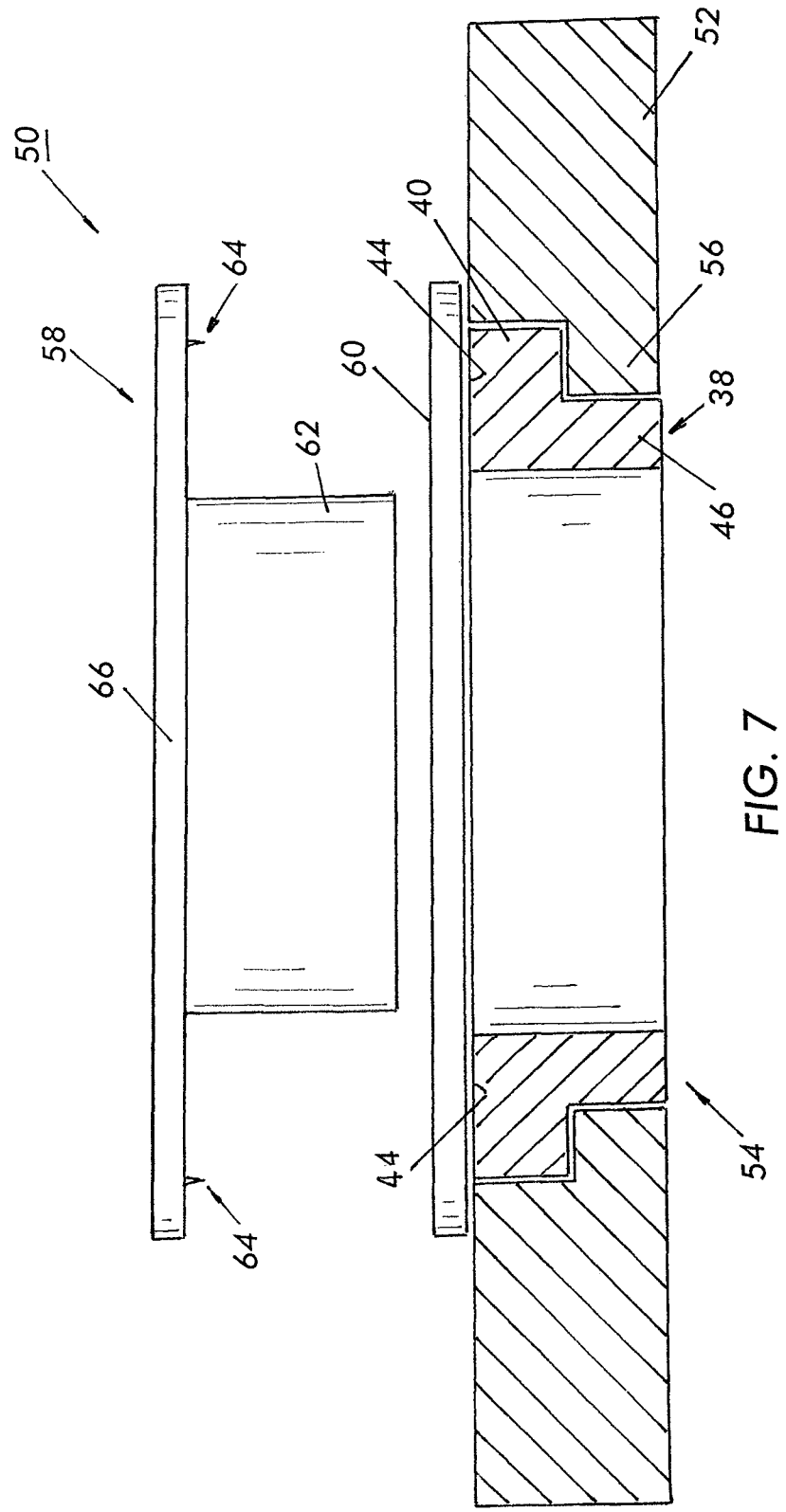
FIG. 7 illustrates an arrangement for forming a filter body and joining the filter body to a filter support.

FIG. 7 illustrates an arrangement 50 for making filter body 36 and joining filter body 36 to filter support 38. Arrangement 50 includes a cradle 52 having an opening 54 that is shaped to receive a filter support 38. Thus, opening 54 may include an annular ledge 56 on which upper ring portion 40 can rest while lower ring portion 46 may be received in the interior of annular ledge 56. A composite die 58 is then used to form filter body 36 from a sheet of filter paper 60 serving as a blank. Specifically, filter paper 60 is positioned over a filter support 38 received by cradle 52. Filter paper 60 is at least as wide as the outer diameter of filter support 38. Composite die 58 includes a forming die section 62, and an annular cutting die section 64 both supported on a common plate 66. At least common plate 66 is heated to a temperature high enough to cause the fusion of filter paper 60 and filter support 38 to achieve heat sealing of the two bodies. To form filter body 36, forming die section 62, which is less wide than the inner diameter of upper ring section 40, is moved toward filter paper 60 until it pushes the same into the interior of filter support 38 thereby forming a pouch or the like body. Once common plate 66 reaches top surface 44 of upper ring section 40, it melts a portion of upper ring section 40 thereby joining upper surface 44 to filter paper that is trapped between common plate 66 and upper surface 44 of upper ring section 40. Cutting die 64, which is slightly wider than the outer diameter of upper ring section 40, is received inside of opening 54 and cuts the excess filter paper 60. Consequently, filter body 36 is formed and joined to filter support 38 and ready to be received inside a cup 12 for storage of a brewable substance.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A cartridge for retaining a mass, comprising:
   a fluid impermeable cup having an interior space defined between a closed bottom and an open mouth, said cup including an annular wall terminating at a top annular edge which defines said open mouth; and
   a fluid permeable filter that retains a mass and is joined to a filter support, wherein said filter and said filter support are received in said interior space and reside below said open mouth, said filter support includes a first ring portion having a radially oriented top surface, and a first circumferential outer surface that rests against said annular wall of said cup to support said filter inside said interior space,
   wherein a top portion of said fluid permeable filter that includes its top edge is received interiorly of said first ring portion and is folded over and directly joined to the radially oriented top surface of said first ring portion, wherein said first ring portion has a first outer diameter sized to allow for intimate contact between said first ring portion and said annular wall of said cup, and wherein said filter support includes a second ring portion having a second outer diameter that is smaller than said first outer diameter of said first ring portion to define a second circumferential outer surface radially recessed inwardly from said first circumferential outer surface, said second ring portion residing below said first ring portion between said first ring portion and said closed bottom of said cup.

2. The cartridge of claim 1, wherein said first ring portion and said second ring portion have interior diameters that are equal to one another.

3. The cartridge of claim 2, wherein said filter is received interiorly of said first ring portion and said second ring portion.

4. The cartridge of claim 3, wherein said cup includes a flange portion radially extending away from said interior space, and wherein said radially oriented surface is spaced from said flange portion.

5. The cartridge of claim 4, further comprising a foil joined with said flange portion.

6. The cartridge of claim 1, further comprising a foil joined with said cup to close said interior space.

7. A retainer for retaining a mass inside of a cup, comprising:
   a filter support comprising a first ring portion with a radially oriented top surface and a first circumferential outer surface and a second ring portion having an outer diameter that is smaller than said outer diameter of said first ring portion to define a second circumferential outer surface that is radially recessed inwardly from said first circumferential outer surface; and
   a fluid permeable filter received inside of said first ring portion and having a top portion that includes said filter's top edge, the top portion being received interiorly of said first ring portion and said second ring portion, is folded over and is directly joined with the radially oriented top surface of said first ring portion, wherein said filter support is configured to be received inside said cup and configured to be supported by said cup,
   wherein said first ring portion has an outer diameter sized so that said first ring portion is received inside said cup and makes intimate contact with an interior surface of an annular wall of said cup.

8. The retainer of claim 7, wherein said outer diameter of said second ring portion is sized so that said second ring portion makes intimate contact with another interior region of said cup.

9. The retainer of claim 8, wherein said first ring portion and said second ring portion have inner diameters that are equal to one another.

10. The retainer of claim 7, wherein said filter comprises filter paper and said support is comprised of plastic.

* * * * *